United States Patent [19]
Momose

[11] 3,995,291
[45] Nov. 30, 1976

[54] MOTOR DRIVING DEVICE FOR A CAMERA

[75] Inventor: Haruhiko Momose, Hachioji, Japan

[73] Assignee: Konishiroku Photo Industry Co., Ltd., Tokyo, Japan

[22] Filed: Dec. 23, 1974

[21] Appl. No.: 535,585

[30] Foreign Application Priority Data
Dec. 28, 1973  Japan............... 48-144778

[52] U.S. Cl................. 354/173; 352/121; 352/169; 352/175; 354/204
[51] Int. Cl.²................ G03B 17/42; G03B 21/38
[58] Field of Search.......... 354/170–173, 354/204, 206; 352/121, 137, 169, 174–175, 178

[56] References Cited
UNITED STATES PATENTS

| | | |
|---|---|---|
| 3,590,710 | 7/1971 | Uno et al.............. 354/173 |
| 3,640,201 | 2/1972 | Kimura............... 354/173 |
| 3,754,455 | 8/1973 | Tsujimoto et al.............. 354/173 |
| 3,820,141 | 6/1974 | Aizawa et al.............. 354/171 |

*Primary Examiner*—L. T. Hix
*Assistant Examiner*—J. A. LaBarre
*Attorney, Agent, or Firm*—Bierman & Bierman

[57] ABSTRACT

A circuit for use in connection with a motor driving device for a camera in which a timing circuit is provided. The timing circuit comprises a resistor and condensor and a switch for discharging the condensor. A second switch is provided in a series with the condensor and actuated by the camera release button to render the timing circuit inoperative in order to quickly ready the camera for additional use.

4 Claims, 1 Drawing Figure

U.S. Patent
Nov. 30, 1976
3,995,291
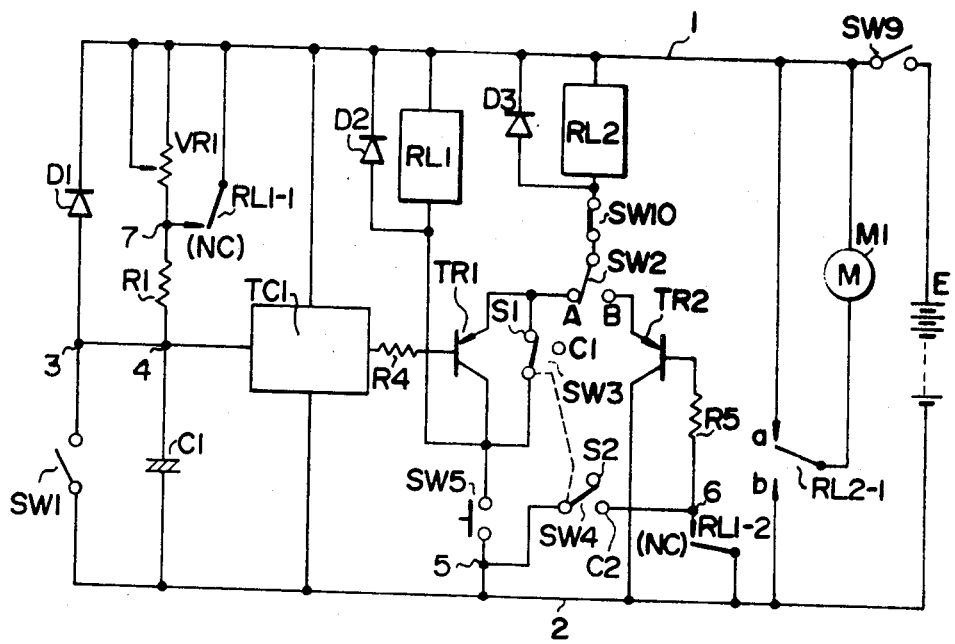

MOTOR DRIVING DEVICE FOR A CAMERA

This invention relates to an improvement of a motor driving device for a camera capable of successive photographing with time intervals.

So far, in successive photographing using a camera equipped with a motor drive device, it is a common practice to employ the system in which the time interval in successive photographing is set at between the finish of exposure and film winding or between the film winding and camera release. In the systems, there is an inconvenience. That is, in case that immediately after a photographing, another photographing is desired, such photographing is impossible. Explaining this in more detail, an electric circuit defining a predetermined time interval remains in its operative state at a time when a finger is removed from a release button and hence next photographing is impossible until the time providing the interval passes. The above inconvenience occurs when a finger is released from a release button immediately after finish of film winding and immediately thereafter the release button is depressed for taking another picture, in the latter system and when the finger is released from the release button immediately after finish of exposure and immediately thereafter the release button is depressed for taking another picture, in the former system.

Therefore, an object of the present invention is to provide a motor driving device for a camera free from the above mentioned inconvenience.

According to the present invention, the above object is accomplished by a motor driving device for a camera comprising a motor for releasing a shutter and winding a film, switching means for control of said motor, means for providing time interval between shots, which means comprises a condenser, a resister connected with said condenser and a first switch to discharge the charge on said condenser, and a second switch connected to said condenser in series, said second switch being actuated by a camera release button so that said second switch may be closed when said camera release button is not operated but may be opened when said camera release button is operated. The present invention is illustrated below with reference to an embodiment shown in the drawing.

The drawing is a circuit diagram of an embodiment of the present invention.

In the drawing, E represents a power supply, 1 represents a positive bus, 2 represents a negative bus, and SW 9 is a power supply switch on the positive bus 1. Between the positive bus 1 and the negative bus 2 are connected a diode D1 a trigger switch SW1, these being connected in series a rheostat VR1 for determining time constant such as a slidable resistance, a fixed resistance R1 which serves as a protector resistance, capacitor C1 for determining time constant, and a switching circuit TC1. Middle points 3 and 4 are connected to each other and connected to the input side of the switching circuit TC1, the output side of the switching circuit TC1 is connected to the base of the pnp type transistor TR 1 via a fixed resistance R4 that serves as a protector resistance. The collector of the transistor TR1 is connected through the release button switch SW5 to the negative bus 2. Between the collector and the positive bus 1 are connected diode D2 and relay RL 1 in parallel. Also, the emitter of the transistor TR1 to which is connected a collector via a switch SW3 for selection of single frame or successive photographing, is connected to one of the fixed contacts of the timing switch SW2 at point A, the other contact B is connected to the emitter of a pnp type transistor TR2 of which collector is connected to the negative bus 2 and of which base is connected to the negative bus 2 through the normally closed relay switch RL 1–2 to be opened by the relay RL 1. The moving piece of the timing switch SW 2 is connected to a switch SW 10 which is actuated by a diaphragm mechanism, and between the switch SW10 and the positive bus 1 are connected diode D3 and relay RL2 in parallel. The point 5 between the release button switch SW5 and the negative bus 2 is connected to the aforesaid switch SW3 via switch SW5. The point 5 is further connected to a point 6 between the resistance R5 and the release switch RL1–2 via a switch SW4 for selection of single frame or successive photographing having contacts s2 and c2 corresponding to single frame photographing contact s1 and successive photographing contact c1. The point 7 between the rheostat VR1 and protector resistance R1 is connected to the positive bus 1 via the relay switch RL1-1 that will be opened when the relay RL1 is working. M is a motor for releasing a shutter to effect exposure and winding a film. One input of the motor M of which other input being connected to the positive bus 1 is connected to a moving piece of the relay switch RL2-1 that will be changed by the relay RL2, and the contact a of the moving piece is connected to the positive bus 1 and the other contact b is connected to the negative bus 2.

The state shown in the drawing is that ready to exposure in single frame photographing where a film has been wound. In the case of successive photographing, the switches SW 3, SW 4 are changed simultaneously to the side of contacts c1 and c2. Then, if the power supply switch SW 9 is made ON, the capacitor c1 for determining time constant, since relay RL1 is inoperative, is charged via the relay switch RL1-1 which has been closed and the resistance R 1. Here, the resistance R 1 is a protector resistance for the switching circuit TC 1 and has a value very much smaller than the time constant providing rheostat VR 1 which changes the time interval, and hence the capacitor C 1 will be charged instantaneously. As the capacitor C 1 is charged fully, the switching circuit TC 1 will be turned on to lower the base potential of the transistor TR 1 to render it conductive.

Under this state, if the release button is pushed to turn the release switch SW 5 ON, a collector current will flow to the transistor TR 1 causing the relay RL 1 to operate. The relay switch RL1-1 is then turned off, and the current flows into the capacitor C 1 through the rheostat VR 1 and resistance R 1. But since the capacitor C 1 will have been charged already, the switching circuit TC 1 is ready to operate, and the current continues to flow to the relay RL 2 through the transistor TR 1. Therefore, the moving piece of the relay switch RL2-1 is changed from the contact a to the contact b causing the motor M to rotate, and releases the shutter.

At this moment, the moving piece of the timing switch SW 2 that will be actuated by the mechanical cam in the motor drive unit (not shown) which pertains to known prior art, will be changed from the contact A to the contact B.

At this moment, a base current will have been input to the transistor TR 2 through the resistance R 5 and the switch SW 4; hence flow of collector current keeps the relay RL 2 to keep its operation. The motor M is kept rotating to initiate exposure. During the exposure, the switch SW 10 which is actuated by a diaphragm mechanism of the camera is turned off to interrupt the current at relay RL 2. The moving piece of the relay switch RL2-1 is then changed from the contact b to the contact a, to apply brake to the motor M to stop it. After exposure is finished, the switch SW 10 is turned on again, causing the motor M to rotate; the film is wound.

As the film is wound up, the trigger switch SW 1 will be turned on at a brief momemt, causing the capacitor C 1 for determining the time constant to be discharged and renders the switching circuit TC 1 to be inoperative. Collector current of the transistor TR 1 is interrupted, the relay RL 2 is rendered inoperative, and the motor M is stopped.

Then, as the time determined by rheostat VR for determining time constant and capacitor C 1 for determining time constant, has passed, the capacitor C 1 will have been charged fully, rendering the switching circuit TC 1 to be operative. The transistor TR 1 is then made conductive to actuate the relay RL 2 and to thereby turn the motor M. Hence so far as the release button is kept pushed, the aforementioned operation will be repeated continuously.

As will be apparent from the foregoing description, according to the camera equipped with a motor driving device of this invention, if a finger is released from the release button during successive photographing operation, the motor will be stopped in a state in which the film is wound up. The capacitor for determining time constant will be discharged, but the relay switch which is interlocked to the release button short-circuits the rheostat, causing the capacitor for determining time constant to be charged fully immediately. Therefore, the switching circuit immediately provides the operative condition; pushing again of a release button allows the shutter to be released immediately, and eliminates the possibility of losing the photographing chance inherent in conventional motor driving device. Even where the power supply switch were turned off for extended periods of time with the switch for selection of single frame or successive photographing left contacting with the side for successive photographing, turning on the power supply switch permits the capacitor for determining time constant to be charged quickly; the shutter assumes the state to be released immediately and there is no fear of losing the photographing chance.

The foregoing description has dealt with the motor drive unit of the system in which a time interval is set between the film winding and the following release, but it should be understood that the invention is also applicable to the motor drive unit of the system in which a time interval is set between finish of exposure and film winding. The invention is further applicable not only to the motor drive unit of a still camera, but also to the time interval setting devices of various cameras such as a motion picture camera, as well as many other time interval setting devices. Further, in the foregoing embodiment, the capacitor for determining time constant was charged by the release switch which is actuated by the release button switch. But the release switch may be replaced by the switch that is mechanically interlocked to the release button switch or by the semi-conductor switch. It should be noted that the present invention is not limited to the aforementioned embodiment only, but can be modified to a variety of designs without departing from the scope of the invention.

What is claimed is:

1. In a motor driving device for a camera comprising a motor for releasing a shutter and winding a film, switching means for control of said motor and means for providing a time interval between exposures connected to said switching means, said means for providing a time interval comprising a condenser, a resistor connected with said condenser and a first switch for discharging the charge on said condenser; a second switch in series with said condenser, said second switch being actuated by a camera release button so that said second switch is closed when said camera release button is not operated to render said time interval providing means inoperative and is open when said camera release button is operated to render said time interval providing means operative.

2. A motor driving device for a camera according to claim 1 wherein said second switch is of the normally closed type and is actuated by a relay energized upon release of said camera release button.

3. A motor driving device for a camera comprising:
 a. a motor for releasing a shutter and winding a film,
 b. switching circuit means for controlling said motor comprising a first switching means for control of said motor to effect shutter release and a second switching means for control of said motor to wind the film,
 c. means for providing a time interval between exposures, said time interval providing means being connected to said switching circuit means,
 d. a switch connected to said time interval providing means and actuated by a camera release button so that once the button is depressed, said time interval providing means is made operative and once the button is released, said time interval providing means is made inoperative.

4. The motor driving device according to claim 3 wherein said time interval providing means is connected to said first switching means.

* * * * *